(12) United States Patent
Li et al.

(10) Patent No.: US 8,387,999 B2
(45) Date of Patent: Mar. 5, 2013

(54) VEHICULAR TORSION BAR SUSPENSION DEVICE

(75) Inventors: Zhidong Li, Shizuishan (CN); Xin Li, Shizuishan (CN)

(73) Assignee: Shizuishan Jinhui Scientific Technology and Trading Co., Ltd, Shizuishan, Ningxia (CN)

( * ) Notice: Subject to any disclaimer, the term of this patent is extended or adjusted under 35 U.S.C. 154(b) by 32 days.

(21) Appl. No.: 12/918,999

(22) PCT Filed: Feb. 20, 2009

(86) PCT No.: PCT/CN2009/070494
§ 371 (c)(1),
(2), (4) Date: Aug. 23, 2010

(87) PCT Pub. No.: WO2009/103241
PCT Pub. Date: Aug. 27, 2009

(65) Prior Publication Data
US 2011/0001301 A1 Jan. 6, 2011

(30) Foreign Application Priority Data
Feb. 23, 2008 (CN) .......................... 2008 1 0074135

(51) Int. Cl.
*B60G 17/02* (2006.01)
*B60G 21/045* (2006.01)
(52) U.S. Cl. .... 280/124.106; 280/124.134; 280/124.167
(58) Field of Classification Search ........... 280/124.106, 280/124.107, 124.134, 124.135, 124.137, 280/124.149, 124.165, 124.166, 124.167
See application file for complete search history.

(56) References Cited

U.S. PATENT DOCUMENTS

| | | | | | |
|---|---|---|---|---|---|
| 1,297,325 | A | * | 3/1919 | Coleman | 280/124.107 |
| 2,083,381 | A | * | 6/1937 | Hutchinson, Jr | 280/104 |
| 2,099,819 | A | * | 11/1937 | Mercier | 280/104 |
| 2,479,572 | A | * | 8/1949 | Hickman | 280/684 |
| 2,607,610 | A | * | 8/1952 | Allison | 280/5.513 |
| 2,788,982 | A | * | 4/1957 | Allison | 280/124.101 |
| 2,794,651 | A | * | 6/1957 | Kolbe | 280/124.103 |
| 2,818,273 | A | * | 12/1957 | Weihsmann | 280/5.514 |
| 2,824,750 | A | * | 2/1958 | De Lorean | 280/788 |
| 2,853,310 | A | * | 9/1958 | Allison | 280/6.158 |
| 2,876,019 | A | * | 3/1959 | Allison | 280/6.158 |
| 2,893,750 | A | * | 7/1959 | Allison | 280/124.101 |
| 2,906,543 | A | * | 9/1959 | Polhemus | 280/104 |
| 2,941,815 | A | * | 6/1960 | Muller | 280/124.107 |
| 2,942,871 | A | * | 6/1960 | Kraus | 267/273 |
| 3,147,990 | A | * | 9/1964 | Wettstein | 280/104 |
| 3,386,751 | A | * | 6/1968 | Allison | 280/104 |

(Continued)

FOREIGN PATENT DOCUMENTS

FR 997849 A * 1/1952
JP 2002254914 A * 9/2002

*Primary Examiner* — Joseph Rocca

(57) ABSTRACT

A vehicular torsion bar suspension device, which comprises a front torsion bar spring and a rear torsion bar spring respectively installed at front and rear suspensions of the vehicle. The opposite ends of the front and rear torsion bar springs on the same side are connected mutually by a connection mechanism, and are connected with a vehicle frame through a positioning device. The connection mechanism is mounted between the front and rear torsion bar springs on the same side, so that a linkage relationship is established between the front and rear torsion bar springs. The device improves the vibration situation of the vehicle when driving the vehicle on an uneven ground, and prevents the vehicle frame and vehicle body skeleton from suffering torsional force. As a result, the usage life of the vehicle is prolonged.

4 Claims, 5 Drawing Sheets

U.S. PATENT DOCUMENTS

| | | | | |
|---|---|---|---|---|
| 3,419,101 A * | 12/1968 | Allison | | 180/345 |
| 3,831,966 A * | 8/1974 | Grosseau | | 280/124.137 |
| 3,990,725 A * | 11/1976 | Allison | | 280/124.146 |
| 3,992,026 A * | 11/1976 | Allison | | 280/104 |
| 4,022,494 A * | 5/1977 | Allison | | 280/124.167 |
| 4,546,997 A * | 10/1985 | Smyers | | 280/5.509 |
| 4,781,364 A * | 11/1988 | Finn et al. | | 267/260 |
| 4,793,630 A * | 12/1988 | Schuit | | 280/124.104 |
| 4,915,409 A * | 4/1990 | Schuit | | 280/124.111 |
| 5,354,041 A * | 10/1994 | Edwards | | 267/277 |
| 5,641,175 A * | 6/1997 | Maeda et al. | | 280/124.137 |
| 5,687,960 A * | 11/1997 | Moon | | 267/273 |
| 5,839,741 A * | 11/1998 | Heyring | | 280/124.106 |
| 6,217,047 B1 * | 4/2001 | Heyring et al. | | 280/124.106 |
| 6,302,417 B1 * | 10/2001 | Heyring | | 280/124.106 |
| 6,425,594 B1 * | 7/2002 | Fader et al. | | 280/124.137 |
| 6,454,284 B1 * | 9/2002 | Worman, Jr. | | 280/124.167 |
| 6,467,784 B1 * | 10/2002 | Kim | | 280/124.106 |
| 6,499,754 B1 * | 12/2002 | Heyring et al. | | 280/124.106 |
| 7,413,196 B2 * | 8/2008 | Borowski | | 280/5.511 |
| 7,625,001 B2 * | 12/2009 | Pavuk | | 280/124.166 |
| 7,748,721 B2 * | 7/2010 | Verbowski | | 280/5.514 |
| 8,006,989 B2 * | 8/2011 | Preukschat et al. | | 280/124.167 |
| 8,052,161 B2 * | 11/2011 | Preukschat et al. | | 280/124.167 |
| 2007/0241528 A1 * | 10/2007 | Verbowski | | 280/124.167 |
| 2008/0150250 A1 * | 6/2008 | Preukschat et al. | | 280/124.134 |
| 2011/0001301 A1 * | 1/2011 | Li et al. | | 280/124.167 |
| 2012/0043152 A1 * | 2/2012 | Jacob-Lloyd | | 180/292 |

* cited by examiner

VEHICULAR TORSION BAR SUSPENSION DEVICE

BACKGROUND OF THE PRESENT INVENTION

1. Field of Invention

The present invention pertains to a vehicle suspension device, especially, a vehicular torsion bar suspension device.

2. Description of Related Arts

Nowadays, there are two types of suspension system. One is non-independent suspension; the other is independent suspension. The axle of the independent suspension is divided into two sections. Each wheel is independently mounted through a spiral spring under the vehicle frame; as a result, when bumping happens to one wheel, the other wheel will not be affected, and thereby the vibrations of the vehicle body will be reduced drastically and accordingly improve the comfortability effectively; especially, when driving in a highway, the running stability will be increase as well. However, this type of suspension structure has complicated structure, little carrying ability; and correspondingly, it makes the drive system and steering system of the vehicle get more complicated. Thus, current sedans have adopted the independent suspension system and have become a development trend.

The independent suspension has varieties of structures, such as sliding pillar type, MacPherson type, link type and etc. There are three types of metallic springs among these independent suspensions; they are spiral spring, leaf spring and torsion bar spring. The spiral spring got the name from its spiral line, and has advantages of light weight and small volume; when the shock force resulting from the road surface acts on the wheels, the spiral spring will be distorted and absorb the kinetic energy of the wheels and convert it into the potential energy of the spiral spring; accordingly the impact of the shock from road surface on the vehicle body will be decreased. The middle part of the leaf spring is fixed through a U-shape bolt to the axle; the spring eyes at two ends are hinged to the bracket of the vehicle frame through a peg; in this way, the axle and vehicle body are connected through the leaf spring; as a result, when the shock force resulting from the road surface acts on wheels, the leaf plate will be distorted and therefore bring the effect of buffering and shock absorption. The torsion bar spring has one end fixedly connected with the vehicle frame and the other end connected with the control arm of the suspension in order to fulfill the shock absorption by virtue of the torsion distortion of the torsion bar. Seen from the transverse section, the torsion bar spring has the circular type, tubular type, rectangular type, stacked type, combined type and etc. The circular torsion bar is applied the most. It takes on the shape of a rod, with two ends being able to be processed into the shape of spline, hexagon and etc., so as to fix one end to the vehicle frame and the other end to the wheels through the control arm. The torsion bar is made of alloy spring steel, which has very good elasticity and is subject to distortion and restoring; actually, it plays the same role as the spiral spring but with different form. When the vehicle is running, the wheels will jolt up and down due to the uneven road, and the control arm will also move up and down accordingly. When the wheels jolts up, the control arm moves up, so that the torsion bar is forced to distort and meanwhile absorb the shock energy. When the shock force gets less, the natural restoring capability of the bar is able to restore rapidly to its original position, and in turn makes wheels back to on the ground, preventing the vehicle from bumping.

Because the torsion bar spring bears only sheering force, a coil spring with the same weight can absorb more than double energy of a leaf plate with the same weight. The torsion bar spring is applied in automobiles in two ways; one is the longitudinal device and the other is the transverse device, the latter being used more often. In the longitudinal device, the torsion bar is used to substitute for the leaf spring and coil spring, which take up more rooms; for example, in the front suspension of vehicle type, Toyota Hiace, Zace, Surf, the torsion bar spring is used to match the A arm type of suspension system. The torsion bar of a transverse device is used to balance the acted force of the left and right wheels and as a balancing bar of anti-tilting, with the exception of fewer vehicle types that use the torsion bar to substitute for the coil spring.

In current auto suspension devices, the torsion bar spring is usually installed on the front suspension device of an automobile. Its front and rear elastic components are independent of each other in between, without any influence and connection. Even if the vibration direction of the front and rear wheels of the automobile is opposite, the impact the automobile gets will not be increased and the body will move in the manner that the front body goes up and the rear body goes down; moreover, when four wheels are not in a same surface or a pair of diagonal wheels bears a bigger force, the body and frame will get a certain amount of torque force; therefore, the current suspension structure still have the following pitfalls, e.g., elastic components are likely subject to be broken, the body and frame is likely subject to be distorted, and so on. In addition, articles carried in vehicles might be damaged and the passengers will feel uncomfortable.

SUMMARY OF THE PRESENT INVENTION

The object of the present invention is to furnish a vehicular torsion bar suspension device that has better integral elasticity performance with the torsion bar spring of the front and rear suspension, and obvious shock absorption effect, thereby to overcome the pitfalls of the current technology.

According to the present invention, the vehicular torsion bar suspension device comprises a front torsion bar spring mounted on the front suspension of a vehicle, and a rear torsion bar spring mounted on the rear suspension of the vehicle; the opposite end of the front and the rear torsion bar spring mounted on the same side of the vehicle is connected with each other through a connection mechanism, and connected with the vehicle frame through a positioning device.

Said connection mechanism is a group of gears installed respectively at the opposite ends of the front and the rear torsion bar spring. The gears of the front and rear torsion bar spring on the same side of the vehicle are engaged with each other.

One end of two reset torsion bar springs is connected to the vehicle frame fixedly; the other end is fixedly installed with a reset gear. The reset gear is engaged with one of two engaging gears of the front and rear torsion bar springs on the same side.

When the structure type of the front and rear suspensions is the double wishbone, one end of the front and rear torsion bar spring is mounted on the upper or lower arm of the control arm of the front and rear suspension; one end of both the front and the rear reset torsion bar spring is connected with the lower or upper arm of the control arm of the front and rear suspension, respectively; the other end of the front and rear reset torsion bar spring is connected fixedly to the vehicle frame.

The positioning device mentioned above is a gear box with gears engaging with each other installed inside. The gear box is connected fixedly with the vehicle frame.

The connection mechanism said above is a differential device installed between the front and rear torsion bar spring at the same side of the vehicle. The positioning device is the case of the differential device; the case is connected fixedly with the vehicle frame.

Two bevel gears that are positioned opposite to each other inside said differential device are connected fixedly with the front and rear torsion bar spring respectively. Another bevel gear that is next to the two bevel gears is connected fixedly with one end of the reset torsion bar spring. The other end of the reset torsion bar spring is connected fixedly to the vehicle frame.

When the structure type of the front and rear suspensions are double wishbone, one end of the front and rear torsion bar spring is mounted on the upper or lower arm of the control arm of the front and rear suspension; the other end is connected fixedly with the two opposite bevel gears in the differential device respectively; one end of both the front and rear reset torsion bar spring is connected with the upper or lower arm of the control arm of the front and rear suspension, respectively; the other end of the front and rear reset torsion bar spring is connected fixedly to the vehicle frame.

Owing to the connection mechanism provided between the front and rear torsion bar spring on the same side of the vehicle, specifically, owing to the gears provided at the ends of the two torsion bar springs, the linkage relationship can be established between the front and rear torsion bar spring on the same side, and as a result, improves the vibration effectively of a running vehicle on uneven roads. If the front wheels are given an upward force, the control arm of the suspension connected with the front wheels will transmit the force to the front torsion bar spring; at the moment, the front torsion bar spring will be distorted, and bring along the rear torsion bar spring to be twisted and distorted as well through the gear installed at its end and engaged with the end of the rear torsion bar spring, the rear torsion bar spring having an opposite distortion direction with the front torsion bar spring; that way, the front and rear wheels are given opposite force applied by the front and rear torsion bar spring, whereby the buffering is achieved, with about ½ of amplitude being offset, and accordingly the horizontal vibration is reduced. If the front wheels are given a downward force or the rear wheels are given an upward or downward force, the transmitting process of the force is the same as in the case where the front wheels are given an upward force; the action of the front and rear torsion bar spring can fulfill the buffering, with ½ of amplitude offset. When the front and rear wheels have the opposite vibration direction but the same amplitude of vibration, the torsion distortion of the front and rear torsion bar spring will be null, and the vibration of whole vehicle body is approximately null, which is the best status of the present suspension device because the shock absorption effect in this situation is the best and the vehicle can keep running horizontally. When four wheels are not on the same level, due to the counterforce of the front and rear torsion bar spring, the front and rear wheels get the same force, and accordingly the wheels that are in the diagonal positions get the same force, therefore the vehicle frame and body skeleton will not be acted upon by the torque force, and thus the life of the vehicle can be prolonged.

DETAILED DESCRIPTION OF THE PREFERRED EMBODIMENT

Example I

Figure 1:
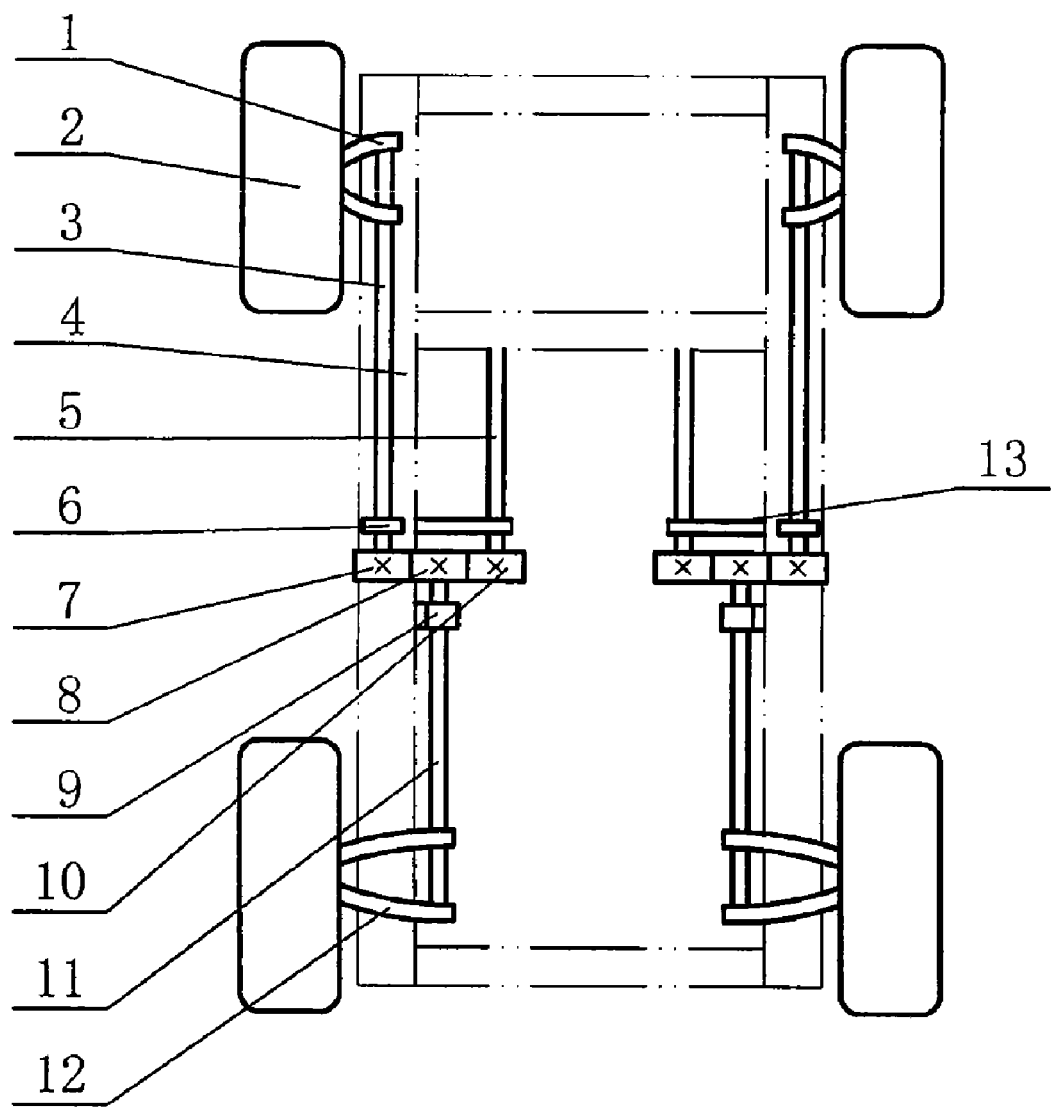
FIG. 1 is the schematic structural diagram of one embodiment of the present invention.

Referring to FIG. 1 the upper end of front torsion bar spring 3 is connected with the control arm 1 of the front suspension of the vehicle; the control arm is connected with the front wheel 2; the lower end of the rear torsion bar spring 11 is connected with the control arm 12 of the rear suspension; at the lower end of the front torsion bar spring and the upper end of the rear torsion bar spring on the both side, the left and the right, is installed with gears 7 and 8 respectively, wherein the a pair of gears on the same side is engaged with each other. The upper ends of two reset torsion bar springs 5 are connected fixedly with the vehicle frame 4, and the lower ends are installed with reset gears 10. The reset gear 10 is engaged with the gear 8 of the rear torsion bar spring on the same side. The three torsion bar springs on the same left side and the same right side said above, are connected with the vehicle frame 13 respectively through the bearing seat 6 of the front torsion bar spring, the bearing seat 9 of the rear torsion bar spring, and the bearing seat 13 of the reset torsion bar spring. Key connection or splined connection can be used at the two ends of the front and rear torsion bar springs in order to connect the suspension control arms and with the gears; thereby, when the front wheels and rear wheels are acted upon by a force, the torsion directions of the front and rear spring at the same side are opposite through the two pairs of gears, therefore offset the applied force of the front and rear wheels, and further reduce the vibration of the vehicle.

The function of the reset torsion bar spring is to make the front and rear torsion bar springs restore rapidly after they get distorted, so as to reduce the vibration and amplitude of the vehicle.

To reduce the amplitude of the vehicle when break happens, a device that have linkage relationship with the break system is installed among the three gears engaging with one another; the linkage device will prevent the occurrence of the relative motion among the three gears engaging with one another, when the action of break goes. The existing break system can be used as the linkage device; for example, install a clamshell break or other type of breaks on one of the three gears.

Example II

Figure 2:
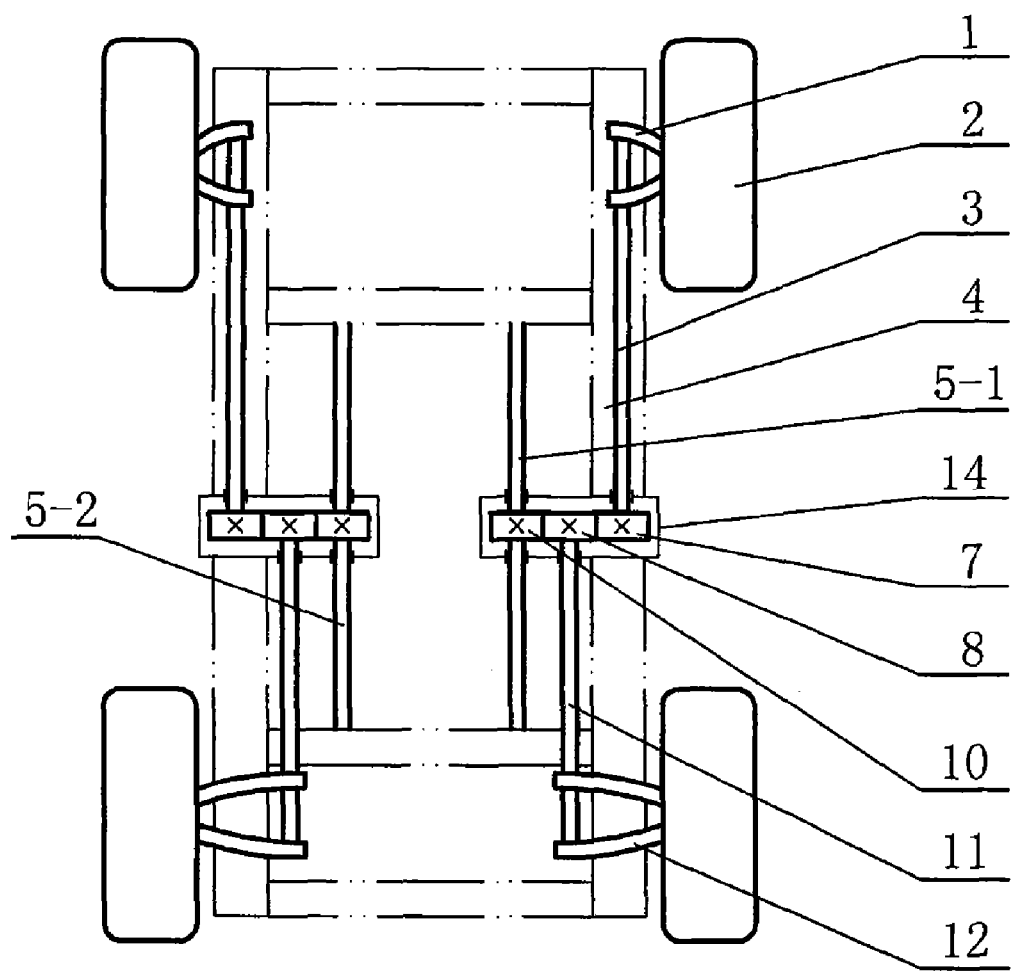
FIG. 2 is the schematic structural diagram of second embodiment of the present invention.

Based on Example I, to prevent the engaging gears from being polluted by various impurities, which will affect their life, as shown in FIG. 2, the three gears at the same side can be put in a gear box 14; by doing so, not only the working status is changed, but also when the gear box 14 is fixed to the vehicle frame 4, the three torsion bar springs at the same side can be positioned, so as to ensure that the three gears can be engaged with one another, and dispense with the three bearing seats. In addition, two extra reset torsion bar springs are installed to make the front and rear torsion bar springs restore rapidly after being distorted, which are front reset torsion bar spring 5-1 and rear reset torsion bar spring 5-2.

Example III

Figure 3:
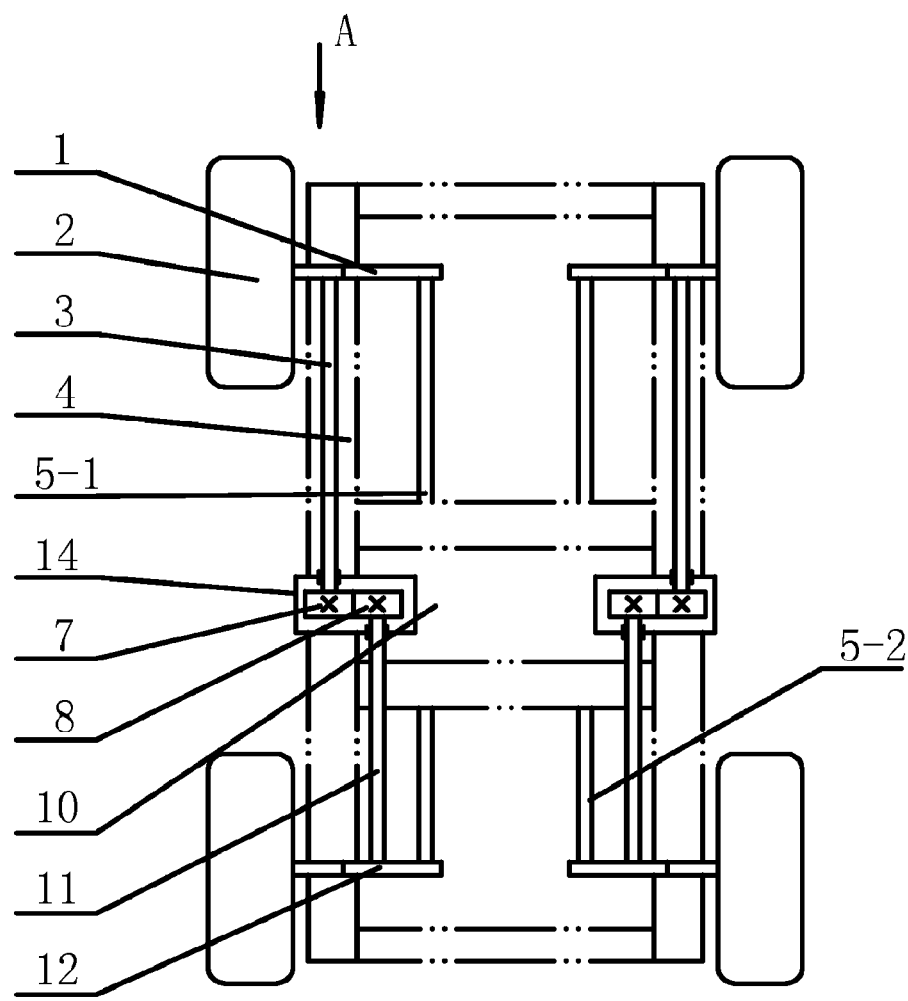
FIG. 3 is the schematic structural diagram of third embodiment of the present invention.
Figure 4:
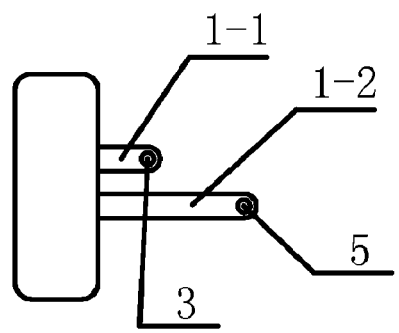
FIG. 4 is the view from A direction of FIG. 3 of the present invention.

Based on Example II, when the suspension control arm is the double wishbone structure, as shown in FIG. 3 and FIG. 4, the upper end of the front torsion bar spring 3 of the left and right side is respectively mounted on the upper arm 1-1 of the control arm 1 of the front suspension of the left and right side; the lower end of the rear torsion bar spring 11 of the left and right side is respectively mounted on the upper arms of the control arm 12 of the rear suspension of the left and right side; the reset torsion bar spring 4 comprises of two front reset torsion bar springs 5-1 and two rear reset torsion bar springs 5-2, wherein the upper end of the front reset torsion bar spring 5-1 is connected with the lower arm 1-2 of the double wishbone of the control arm 1 of the front suspension, and the lower end of the rear reset torsion bar spring 5-2 is connected with the lower arm of the control arm 12 of the rear suspension, and the lower ends of the front reset torsion bar springs and the upper ends of the rear reset torsion bar springs are connected with the vehicle frame; therefore, through the action of the front and rear torsion bar springs that get distorted, the front and rear control arms can be restored to their original positions rapidly.

Figure 5:
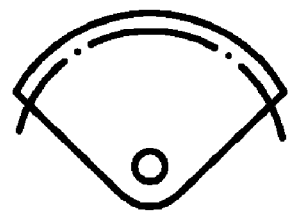
FIG. 5 is the schematic structural diagram of the gears of the present invention.

Among the three examples said above, the gears can be made in a fan-shape for the sake of material saving, as in FIG. 5. The engaging gears on the same side can be arranged according to their spacial distribution situation, such as arranged in a triangle form or arranged with some on the upper place and others on the lower place.

Example IV

Figure 6:
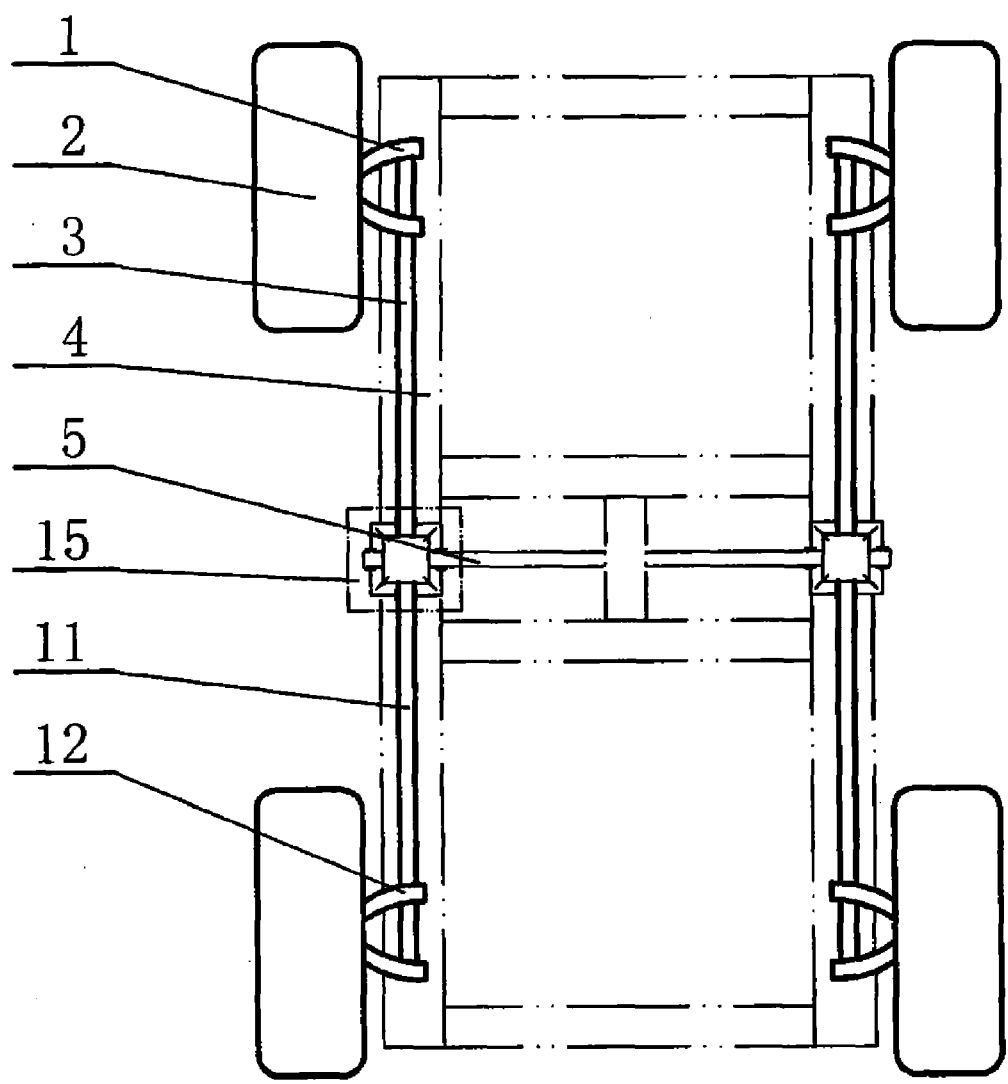
FIG. 6 is the schematic structural diagram of the fourth embodiment of the present invention.
Figure 7:
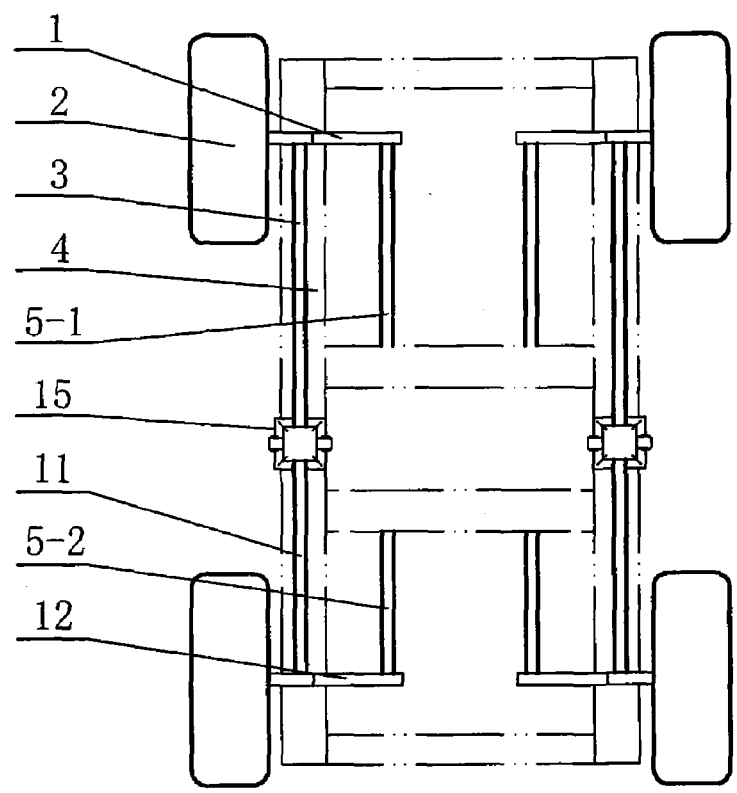
FIG. 7 is the schematic structural diagram of the fifth embodiment of the present invention.
Figure 8:
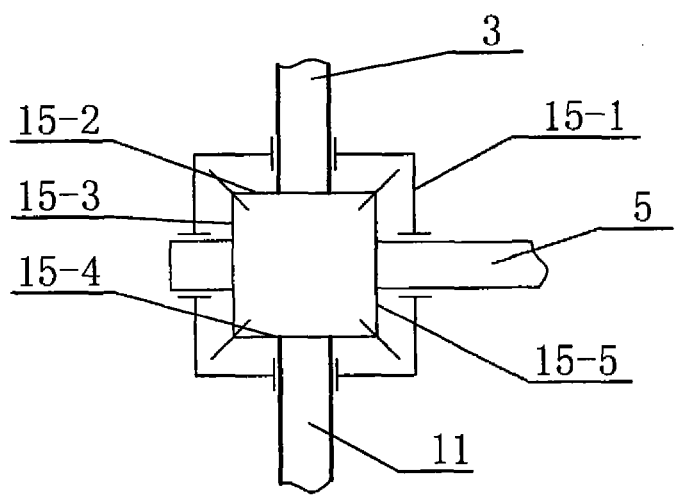
FIG. 8 is the schematic structural diagram of the differential device of the fourth embodiment.

Based on the structure of example II, the three gears at the same side are replaced with a differential device 15 in this embodiment. As shown in FIG. 6 and FIG. 8, the differential device is the common one that is used in the current vehicles, which is comprised of four bevel gears engaging with one another installed in a case 15-1; the case is fixed to the vehicle frame 4 for the sake of positioning. The lower end of the front torsion bar spring 3 of the both sides is connected fixedly with the first bevel gear 15-2; the upper end of the rear torsion bar spring 11 of the both sides is connected fixedly with the third bevel gear 15-4; the right end of the left reset torsion bar springs and left end of the right reset torsion bar spring are connected with the vehicle frame 4, respectively; the other end of the two reset torsion bar springs of the left and right side is connected with the fourth bevel gear 15-5; the second bevel gear 15-3 is positioned inside the case through a short shaft.

When the front or rear wheels are acted upon by an upward force, the control arm 1 of the front suspension or the control arm 12 of the rear suspension is brought upward, so that the front and rear torsion bar springs get distorted; the distortion force is transmitted through the bevel gears in the differential device to the left and right reset torsion bar springs, so that the reset torsion bar springs get distorted as well. Because of the function of the differential device, the distortion directions of the front and rear torsion bar springs are opposite; therefore, the acted force of the front and rear wheels will be offset, and further reduces the vibration of the vehicle.

Example V

This embodiment is changed according to the structure of the fourth embodiment. When the control arm of the front and rear suspension is the structure of double wishbone, as in FIG. 4, the lower end of the front torsion bar spring of both sides is connected fixedly with the first bevel gear 15-2; the upper end of the rear torsion bar spring 11 of both sides is connected fixedly with the third bevel gear 15-4; the lower end of the upper reset torsion bar spring 5-1 of both left and right sides is connected independently on the vehicle frame 4, and the upper end is fixed on the lower arm 1-2 of the control arms 1 of the front suspension of both sides; the upper end of the lower reset torsion bar springs 5-2 of both left and right sides is independently connected on the vehicle 4, and the lower end is fixed on the lower arm of the control arm 12 of the rear suspensions of both sides.

It will thus be seen that the objects of the present invention have been fully and effectively accomplished. Its embodiments have been shown and described for the purpose of illustrating the functional and structural principles of the present invention and is subject to change without departure from such principles. Therefore, this invention includes all modifications encompassed within the spirit and scope of the following claims.

What is claimed is:

1. A vehicular torsion bar suspension device, comprising:
a front suspension;
a rear suspension;
a vehicle frame;
front torsion bar springs mounted on the front suspension of a vehicle;
rear torsion bar springs mounted on the rear suspension of the vehicle;
a connection mechanism, through which the ends of the front and the rear torsion bar spring mounted on the same side of the vehicle opposite to each other are connected; and
a positioning device, through which the opposite end of the front and the rear torsion bar spring mounted on the same side of the vehicle is connected with the vehicle frame, wherein the connection mechanism is a group of gears installed respectively on the opposite end of the front and the rear torsion bar spring; the gears of the front and the rear torsion bar spring on the same side of the vehicle are engaged with each other,
wherein the vehicular torsion bar suspension device further comprises two reset torsion bar springs, each one having one end connected fixedly with the vehicle frame and the other end installed with a reset gear; the reset gear is connected with one of two engaging gears on the front and the rear torsion bar spring on the same side.

2. The vehicular torsion bar suspension device, as recited in claim 1, wherein when the front and rear suspension is double wishbone type, one end of the front and the rear torsion bar spring is mounted on the upper or lower arm of the control arm of the front and the rear suspension; one end of the front and the rear reset torsion bar spring is connected with the lower or upper arm of the control arm of the front and the rear suspension, respectively, and the other end of the front and rear reset torsion bar spring is connected fixedly to the vehicle frame.

3. The vehicular torsion bar suspension device, as recited in claim 2, wherein the positioning device is a gear box with engaging gears installed inside; the gear box is connected with the vehicle frame.

4. The vehicular torsion bar suspension device, as recited in claim 1, wherein the positioning device is a gear box with engaging gears installed inside; the gear box is connected with the vehicle frame.

* * * * *